W. G. McNAB & R. J. McCLEERY.
AUTOMOBILE LOCK.
APPLICATION FILED JAN. 13, 1913.
1,078,105.
Patented Nov. 11, 1913.
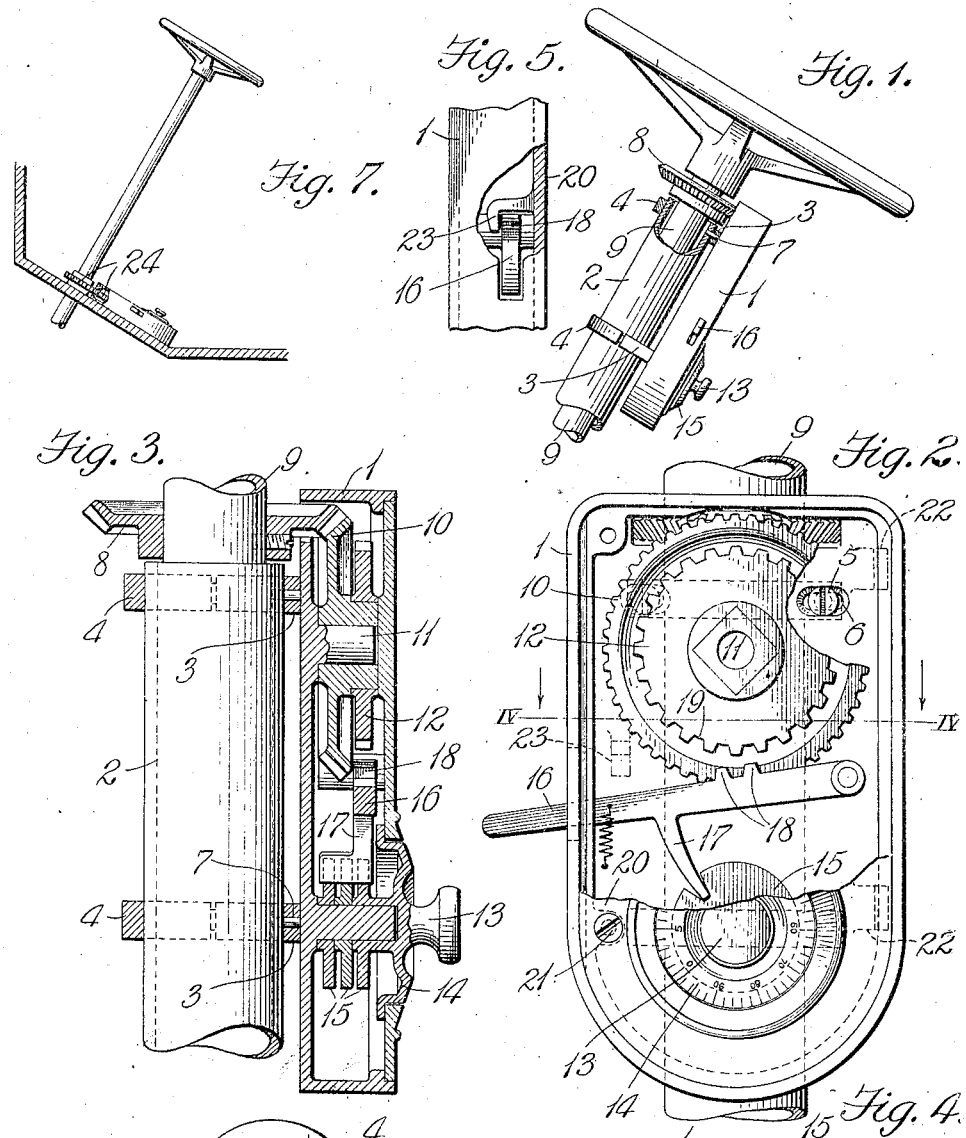
Witnesses
Chas. W. Stauffiger
Anna M. Dorr
Inventors
Warren G. McNab
Robert J. McCleery
By Bartholf Hantz
Attorneys

UNITED STATES PATENT OFFICE.

WARREN G. McNAB, OF WYANDOTTE, AND ROBERT J. McCLEERY, OF DETROIT, MICHIGAN.

AUTOMOBILE-LOCK.

1,078,105.　　　　Specification of Letters Patent.　　Patented Nov. 11, 1913.

Application filed January 13, 1913.　Serial No. 741,730.

*To all whom it may concern:*

Be it known that we, WARREN G. McNAB and ROBERT J. McCLEERY, citizens of the United States of America, residing at Wyandotte and Detroit, respectively, in the county of Wayne and State of Michigan, have invented certain new and useful Improvements in Automobile-Locks, of which the following is a specification, reference being had therein to the accompanying drawings.

This invention relates to a lock for automobiles and the like and to means whereby the steering gear may be held so that the vehicles cannot be moved for any distance.

The invention includes means which prevent the tampering with the parts when the mechanism is locked.

The invention consists in the matters hereinafter set forth and pointed out in the claims.

In the drawings, Figure 1 is a view, partially in elevation and partially broken away, of a steering wheel and a post equipped with a lock that embodies features of the invention; Fig. 2 is a plan view, slightly enlarged, of the lock itself in open position with the casing partly broken away to give clear view; Fig. 3 is a view in longitudinal section of the lock; Fig. 4 is a view in section through the lock taken on or about line IV—IV of Fig. 2; Fig. 5 is a view in detail showing the engagement of the latch with a casing cover; Fig. 6 is a view in detail showing the method of attaching the lock to a steering post; and Fig. 7 is a view showing a modification in the arrangement of the lock.

Referring to the drawings, a casing adapted to house a lock mechanism, is adapted to be secured to the stationary post 2 of a steering wheel as by a saddle 3 and clip 4, the latter being held by screws 5 passing through slotted openings 6 in the back of the casing. A dowel 7 is used to center the casing on the saddle, while the slots permit variations in the width of the saddle to accommodate different diameters of posts. A beveled gear 8 keyed or made fast to the steering wheel shaft 9, passes through a slot in the back of the casing 1 and into mesh with a pinion 10. The latter rotates on a stud 11 and carries a stop wheel 12 non-rotatably secured on the squared or splined hub of the pinion. A permutation lock mechanism indicated at 13 with the usual outer dial plate 14 and inner tumbler plates 15, is mounted in the casing 1 in operative relation to a swinging latch 16 whose detent 17 is adapted to ride on the tumblers 15 and to drop into engagement with them when they are in register, and is likewise provided with teeth 18 that engage with escapement notches 19 in the periphery of the stop wheel 12 when the detent is not interlocking with the tumbler disks. The end portion of the latch projects from the casing whereby it may be thrust into engagement with the wheel 12 and the lock set to hold it in position. A cover 20 is secured on the casing as by screws 21, and is provided with ears 22 that underrun corresponding projections in the casing when the cover is in position. When the latch 16 is in engagement with the wheel 12, it underlies an ear 23 on the casing cover 20 so that removal of the screws 21 does not release the cover. As shown in Fig. 7 the gear connection between the steering wheel shaft and the stop wheel may be varied by the use of spur gears indicated at 24, the casing being mounted on the foot board or in any other operative relation to the steering wheel shaft in automobiles of the type in which the stationary outer post is omitted.

One feature of the device is its simplicity and the arrangement whereby it cannot be displaced when once locked. Another feature is the adaptability of the device to steering mechanisms of different types.

Obviously, changes in the details of construction may be made without departing from the spirit of our invention and we do not care to limit ourselves to any particular form or arrangement of parts.

What we claim is:—

1. A lock for automobiles including a casing, a pinion in the casing, a stop wheel driven positively by the pinion, a latch in the casing, permutation lock mechanism in the casing adapted to hold the latch in engagement with the stop wheel when the mechanism is set, a gear adapted to mesh with the pinion and to be secured to turn with the rotating member of the steering gear, a cover on the casing, and means adapted to lock the cover to the casing when the latch is in engagement with the stop wheel.

2. A lock for automobiles comprising a casing, means for securing the casing in position accessible from the interior of the casing only, a pinion in the casing, a stop wheel positively driven by the pinion, a latch adapted to lock with the stop wheel, permutation lock mechanism adapted to hold the latch in engagement with the stop wheel when set, a gear adapted to be secured to the rotating member of a steering mechanism in mesh with the pinion, and a cover for the casing that is locked in position by the latch when the latter engages the stop wheel.

3. A lock for automobiles comprising a casing, means accessible within the casing only for securing the latter in position, a pinion journaled in the casing, a gear adapted to be secured to the rotatable member of an automobile steering gear in mesh through a slot in the casing with the pinion, a stop wheel secured to turn in unison with the pinion in the casing, a latch swinging in the casing having a detent member adapted to engage and lock the stop wheel, permutation lock mechanism adapted to hold the latch detent locked with the stop wheel when the permutation mechanism is set, a removable cover for the casing, and means that locks the cover in position when the latch is held engaged with the stop wheel.

In testimony whereof we affix our signatures in presence of two witnesses.

WARREN G. McNAB.
ROBERT J. McCLEERY.

Witnesses:
ANNA M. DORR,
GENEVIEVE E. McGRANN.